July 17, 1923.
C. FRANZENBURG
1,461,869
NOVEL DEVICE FOR SECURING ENGINES ON MOTOR CYCLES
Filed June 17, 1921
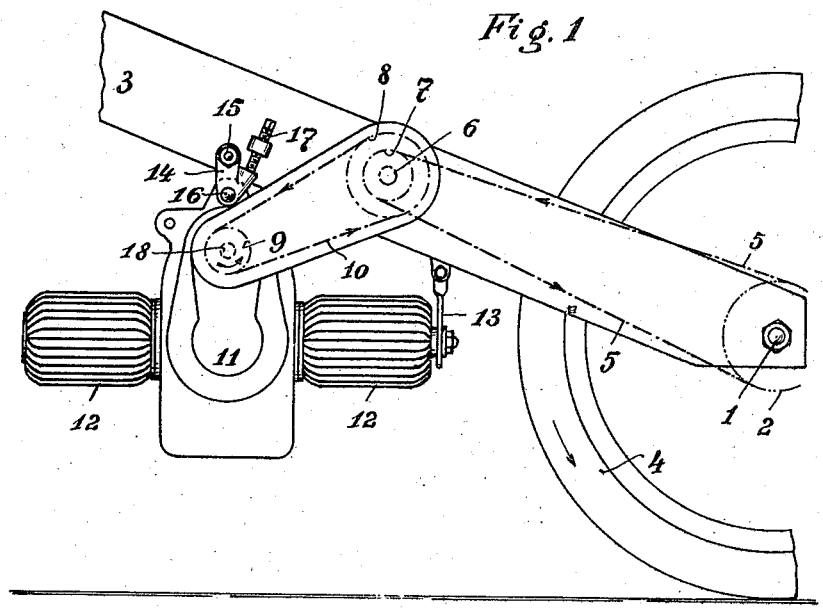
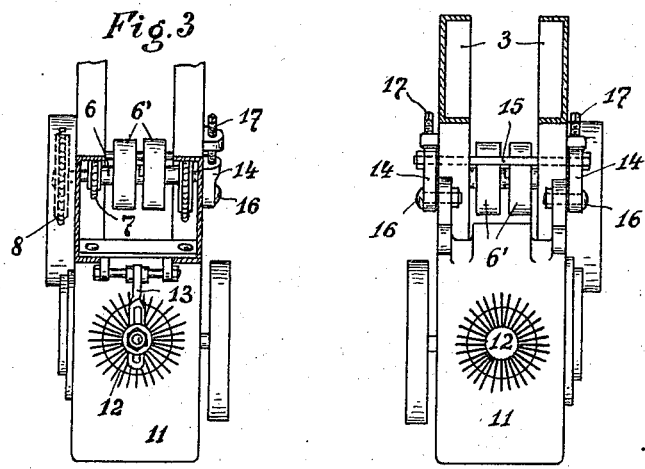
Inventor:
Claus Franzenburg
By: Herbert G. Ry
Attorney.

Patented July 17, 1923.

1,461,869

UNITED STATES PATENT OFFICE.

CLAUS FRANZENBURG, OF NUREMBERG, BAVARIA, GERMANY, ASSIGNOR TO THE FIRM MARSWERKE A.-G. OF NUREMBERG-DOOS, GERMANY.

NOVEL DEVICE FOR SECURING ENGINES ON MOTOR CYCLES.

Application filed June 17, 1921. Serial No. 478,340.

(GRANTED UNDER THE PROVISIONS OF THE ACT OF MARCH 3, 1921, 41 STAT. L., 1313.)

*To all whom it may concern:*

Be it known that I, CLAUS FRANZENBURG, a citizen of the German Republic, and a resident of Nuremberg, Bavaria, Germany, have invented certain new and useful Improvements in a Novel Device for Securing Engines on Motor Cycles (for which I have obtained patents in Germany, No. 358,170, application filed May 19, 1920; Switzerland, No. 88,670, application filed July 2, 1920; Denmark, No. 28,662, application filed July 7, 1920; Norway, No. 35,292, application filed July 9, 1920; Portugal, No. 11,702, application filed July 10, 1920; Czechoslovakia, No. 6,711, application filed July 2, 1920; France, No. 520,411, application filed July 10, 1920; Austria, No. 86,348, application filed June 26, 1920; Great Britain, No. 169,549, application filed July 9, 1920; Spain, No. 74,553, application filed July 8, 1920; and Belgium, No. 289,533, application filed July 20, 1920), of which the following is a specification.

This invention relates to a novel device for securing the engine on motor cycles, which on the one hand facilitates the fixing of the engine to the frame, and on the other hand ensures a reliable and simple adjustment of the engine in the longitudinal axis of the cycle frame.

According to the invention, the engine placed in the longitudinal axis of the frame is suspended like a pendulum from two links arranged opposite each other in the transverse direction of the frame, so that it takes up its normal position as accurately as possible, the locking or fixing of the engine being effected by connecting a third point of the engine to a stay rod secured to the frame.

In that way the engine can be easily adjusted and locked in its correct position. As another novel feature may be mentioned that on the two links secured to the frame and supporting the engine, act set screws mounted in the frame, the adjustment of the said screws producing a movement of the links about their suspension pin and therefore at the same time a movement of the engine in the horizontal direction.

Owing to this mobility of the engine in its suspension joints, the latter act also as chain stretching devices, so that other devices for this purpose become unnecessary. By suitable differential adjustment of the set screws arranged on both sides and acting on the suspension lugs, it is possible also to obtain a fine adjustment of the engine relatively to the central axis of the frame, owing to which an irreproachable running of the driving chains is ensured.

An example of the new method of fixing the engine is illustrated in the accompanying drawings, only the rear part of the motor cycle being shown, all the details which are not essential to the invention, being omitted.

Figure 1 is a side elevation of the engine suspended to the frame, while Figures 2 and 3 are cross-sections through the frame, showing the front and rear ends of the engine.

In the construction illustrated, the motor cycle frame 3 is assumed to be an oblique hollow girder constituted by two side plates and going obliquely from the front wheel fork down to the spindle 1 of the rear wheel 4. From the said frame 3 the engine 11 with its two lateral cylinders 12. is suspended by means of links 14 arranged at opposite sides.

The links 14 are mounted on both sides of the frame girder 3 and are adjustably supported on a spindle 15 which passes through the upper eyes of the links and the frame girder.

From the bottom eye of the link is suspended like a pendulum the engine 11, 12 by means of pins 16. The point of suspension is so selected that the suspended engine takes up its normal position as correctly as possible.

The locking of the engine relatively to the frame is done by means of a supporting rod 13 pivoted to the frame and engaging with a third point of the engine, the engine being screwed to the said rod. The rigid position and adjustment of the engine which is suspended merely on the two lateral links 14 and stiffened by the supporting rod or stay 13, is thereby secured.

The opposite links 14 are provided with projections on which act set screws 17 which in their turn are adjustable in bosses provided on the frame.

By operating the set screws 17, the links 14 are turned about their point of suspension 15, owing to which the engine is at the same time correspondingly moved in the horizontal direction. The stay rod screw joint 13 is then disengaged so that it does not exercise a braking action and does not interfere with the readjustment of the engine about the suspension pins 16.

After the adjustment of the links 14 or of the engine 11, 12 has been effected by means of the set screws 17, the stay 13 is agains screwed to a suitable extent against the third engine point, so that the engine is again locked on the frame. The driving of the rear wheel 4 from the engine 11 is effected, in the construction illustrated, by means of a gear 6', the spindle 6 of which is mounted in the motor cycle frame 3.

From the driving engine shaft 18 is driven by means of the chain wheel 9 mounted on the said shaft, the driving chain wheel 8 of the secondary shaft 6.

The shaft 6 has moreover lateral chain wheels 7 which drive by means of chains 5 driving wheels 2 mounted at both sides of the rear wheel 4 on its spindle 1.

According as the intermediate gear 6, 6' in thrown in, the left or the right hand chain drive 2, 5, 7 will act as a driving part on the rear wheel.

In the event of the chain 10 which goes from the motor shaft 18 to the drive 6, 6', becoming loose, it could be stretched by operating the set screws 17 acting on the suspension links 14, after having previously released the stay connection 13.

On the screws 17 being tightened, the links 14 will swing forward and move the engine to a corresponding extent so that the chains 10 will be stretched.

Instead of driving the rear wheel 4 through the intermediate gear 6, 6', it could be of course driven direct from the engine shaft 18 in other constructions.

Any loosening of the chain could also be compensated in such cases by the above described simple movement of the engine.

Any lateral movement of the engine with this method of fixing cannot take place, but by a differential adjustment of the set screws 17, the engine can be finely adjusted relatively to the central axis of the frame, owing to which it is possible to a certain extent to adjust the chain wheels relatively to each other, and a perfect running of the driving chains is secured.

The new method of fixing the engine is not restricted to the special frame construction shown in the drawing, but could be applied in an equally satisfactory manner to other constructions of the frame.

Having thus described the nature of my invention, what I claim as new and desire to secure by Letters Patent of the United States is:

In a device for securing the engine in motor cycles, the combination, with the engine, of two links pivotally secured to opposite sides of the cycle frame and adapted to support the engine, placed in the longitudinal axis of said frame, in a pendulum like manner so as to cause said engine to take up its normal position as correctly as possible, set screws mounted in the cycle frame and adapted to act on the links, the adjustment of the said screws producing a movement of said links about their suspension points and therefor at the same time a movement of the engine in the horizontal direction, and a brace rod, rigidly secured to the cycle-frame and fixed to the engine in such a manner, as to allow said longitudinal adjustment of the latter.

In testimony whereof I affix my signature in presence of two witnesses.

CLAUS FRANZENBURG.

Witnesses:
GEORG FRÜHWALZ,
ROSA RIEDEL.